United States Patent [19]
Bartkowiak et al.

[11] Patent Number: 5,930,489
[45] Date of Patent: Jul. 27, 1999

[54] MICROPROCESSOR CONFIGURED TO DETECT MEMORY OPERATIONS HAVING DATA ADDRESSES INDICATIVE OF A BOUNDARY BETWEEN INSTRUCTIONS SETS

[75] Inventors: John G. Bartkowiak; Thang M. Tran, both of Austin, Tex.

[73] Assignee: Advanced Micro Devices, Inc., Sunnyvale, Calif.

[21] Appl. No.: 08/599,617

[22] Filed: Feb. 9, 1996

[51] Int. Cl.$^6$ .............................. G06F 9/30; G06F 9/32; G06F 12/00
[52] U.S. Cl. .......................... 395/376; 395/380; 395/384; 395/385; 395/387; 395/393; 395/800.23; 395/800.41; 395/800.42
[58] Field of Search .................. 395/182.13, 185.03, 395/393, 376, 380, 571, 800, 384–391, 200.75, 800.23, 800.24, 800.26, 800.41, 377, 800.42

[56] References Cited

U.S. PATENT DOCUMENTS

| | | | |
|---|---|---|---|
| 5,319,764 | 6/1994 | Shimizu | 395/200.75 |
| 5,559,975 | 9/1996 | Christie et al. | 395/571 |
| 5,574,928 | 11/1996 | White et al. | 395/376 |
| 5,640,526 | 6/1997 | Mahin et al. | 395/383 |
| 5,659,782 | 8/1997 | Senter et al. | 395/800.23 |
| 5,737,636 | 4/1998 | Caffo et al. | 395/874 |

OTHER PUBLICATIONS

Shand, M., et al., "Hardware Speedups in Long Integer Multiplication," vol. 19, No. 1, Mar. 1, 1991, pp. 106–113.

Murray, D.A., "XEDEX's Baby Blue Co–Processor Technology for the IBM Personal Computer and Other Plug–Compatible Computers," vol. 8, No. Suppl., 1983, New York, US, pp. 1–5.

Davis, A.C., et al., "Interfacing a Hardware Multiplier to a General–Purpose Microprocessor," Microprocessors and Microsystems, vol. 1, No. 7, Oct. 1977, London GB, pp. 425–431.

Johnson, Mike, *Superscalar Microprocessor Design*, Prentice Hall, Englewood Cliffs, NJ, 1991, pp. 92–94.

*Primary Examiner*—Parshotam S. Lall
*Assistant Examiner*—Bharat Barot
*Attorney, Agent, or Firm*—Conley, Rose & Tayon, PC; B. Noel Kivlin

[57] ABSTRACT

A microprocessor configured to detect a memory operation having a predefined data address is provided. The predefined data address indicates that subsequent instructions belong to an alternate instruction set. In one embodiment, a second memory operation having the predefined data address indicates that instructions subsequent to the second memory operation belong to the original instruction set. The memory operations effectively provide a boundary between the instructions from dissimilar instruction sets. Instructions are routed to an execution unit configured to execute the instruction set indicated by the most recently detected memory operation having the predefined address. Each instruction sequence within the program may be coded using the instruction set which most efficiently executes the function corresponding to the instruction sequence. The program may be executed more quickly than an equivalent program coded entirely in either instruction set. In one embodiment, the microprocessor executes the x86 instruction set and the ADSP 2171 instruction set.

19 Claims, 5 Drawing Sheets

MICROPROCESSOR CONFIGURED TO DETECT MEMORY OPERATIONS HAVING DATA ADDRESSES INDICATIVE OF A BOUNDARY BETWEEN INSTRUCTIONS SETS

BACKGROUND OF THE INVENTION

1. Field of the Invention

This invention is related to the field of microprocessors and, more particularly, to a microprocessor configured to detect a data address corresponding to a memory operation as a boundary between instructions belonging to a first instruction set and instructions belonging to a second instruction set.

2. Description of the Relevant Art

Computer systems employ one or more microprocessors, and often employ digital signal processors (DSPs). The DSPs are typically included within multimedia devices such as sound cards, speech recognition cards, video capture cards, etc. The DSPs function as coprocessors, performing complex and repetitive mathematical computations demanded by multimedia devices and other signal processing applications more efficiently than general purpose microprocessors. Microprocessors are typically optimized for performing integer operations upon values stored within a main memory of a computer system. While DSPs perform many of the multimedia functions, the microprocessor manages the operation of the computer system.

Digital signal processors include execution units which comprise one or more arithmetic logic units (ALUs) coupled to hardware multipliers which implement complex mathematical algorithms in a pipelined manner. The instruction set primarily comprises DSP-type instructions (i.e. instructions optimized for the performance of complex mathematical operations) and also includes a small number of non-DSP instructions. The non-DSP instructions are in many ways similar to instructions executed by microprocessors, and are necessary for allowing the DSP to function independent of the microprocessor.

The DSP is typically optimized for mathematical algorithms such as correlation, convolution, finite impulse response (FIR) filters, infinite impulse response (IIR) filters, Fast Fourier Transforms (FFTs), matrix computations, and inner products, among other operations. Implementations of these mathematical algorithms generally comprise long sequences of systematic arithmetic/multiplicative operations. These operations are interrupted on various occasions by decision-type commands. In general, the DSP sequences are a repetition of a very small set of instructions that are executed 70% to 90% of the time. The remaining 10% to 30% of the instructions are primarily boolean/decision operations. Many of these mathematical algorithms perform a repetitive multiply and accumulate function in which a pair of operands are multiplied together and added to a third operand. The third operand is often used to store an accumulation of prior multiplications. Therefore, DSP hardware often includes hardware configured to quickly perform a multiply-add sequence. An exemplary DSP is the ADSP 2171 available from Analog Devices, Inc. of Norwood, Mass.

Many instruction sequences (or "routines") which perform complex mathematical operations may be more efficiently performed in a DSP instruction set such as that employed by the ADSP 2171 than in the x86 instruction set. Microprocessors often execute instructions from the x86 instruction set, due to its widespread acceptance in the computer industry. It is desirable to code the various instruction sequences of a program in the instruction set (DSP or x86, for example) which is most efficient at performing the task the instruction sequence represents. Furthermore, a method is desired for indicating the instruction set in which each instruction sequence in a particular program is coded. As used herein, an "instruction set" refers to a plurality of instructions defined for execution by a particular microprocessor. Each instruction within the instruction set is assigned a unique encoding identifying the instruction from the other instructions within the instruction set.

SUMMARY OF THE INVENTION

The problems outlined above are in large part solved by a microprocessor configured to detect a memory operation having a predefined data address. The predefined data address indicates that subsequent instructions belong to an alternate instruction set. In one embodiment, a second memory operation having the predefined data address indicates that instructions subsequent to the second memory operation belong to the original instruction set. Instructions are routed to an execution unit configured to execute the instruction set indicated by the most recently detected memory operation having the predefined address. Advantageously, a program may be coded using multiple instruction sets. Each instruction sequence within the program may be coded using the instruction set which most efficiently executes the function corresponding to the instruction sequence. The program may be executed more quickly than an equivalent program coded entirely in either instruction set.

In one embodiment, the microprocessor executes the x86 instruction set and the ADSP 2171 instruction set. Advantageously, complex mathematical functions (which are more efficiently executed within a DSP) may be performed more efficiently than previously achievable using the x86 instruction set alone. Portions of the program which may be executed more efficiently using x86 instructions may be coded in the x86 instruction set, while portions of the program which may be executed more efficiently using DSP instructions may be coded in the DSP instruction set. Each of the above portions is separated from other portions by the memory operation having the predefined data address, so that the microprocessor may determine which instruction set the instructions belong to. The memory operation thereby effectively provides a boundary between the instructions from dissimilar instruction sets.

Broadly speaking, the present invention contemplates a microprocessor comprising an instruction cache, and instruction decode unit, and a load/store unit. The instruction cache is configured to store a plurality of instructions including a first plurality of instructions belonging to a first instruction set and a second plurality of instructions belonging to a second instruction set. Coupled to receive the plurality of instructions is the instruction decode unit. The instruction decode unit is configured to decode the plurality of instructions. Finally, the load/store unit is coupled to receive memory operations included within the plurality of instructions. The instruction decode unit is configured to dispatch the memory operations to the load/store unit. Upon receipt of a memory operation, the load/store unit is configured to detect a particular data address corresponding to one of the memory operations. The particular data address is defined to indicate that the corresponding one of the memory operations forms a boundary between the first plurality of instructions and the second plurality of instructions.

The present invention further contemplates a method for executing instructions from a pair of instruction sets in a microprocessor. A memory operation having a particular data address is detected. The particular data address is defined to indicate a boundary between a first plurality of instructions belonging to a first of the pair of instruction sets and a second plurality of instructions belonging to a second of the pair of instruction sets. Instructions from the first of the pair of instruction sets are executed if the memory operation is not detected. Conversely, if the memory operation is detected, instructions are executed from the second of the pair of instruction sets.

BRIEF DESCRIPTION OF THE DRAWINGS

Other objects and advantages of the invention will become apparent upon reading the following detailed description and upon reference to the accompanying drawings in which.

Figure 1:
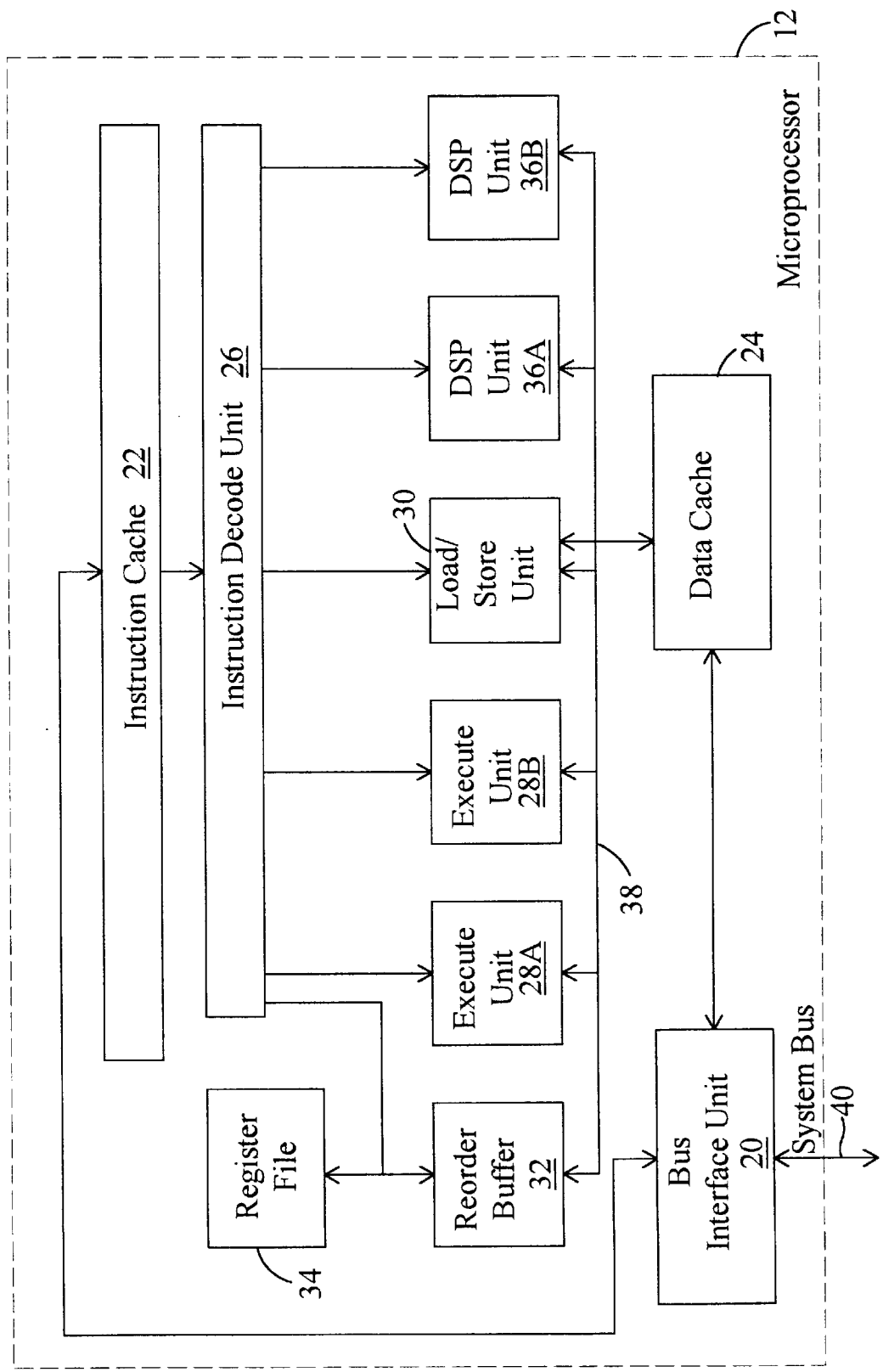
FIG. 1 is a block diagram of a microprocessor including an instruction decode unit, a load/store unit, and a reorder buffer.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, one embodiment of microprocessor 12 is shown. Microprocessor 12 includes a bus interface unit 20, an instruction cache 22, a data cache 24, an instruction decode unit 26, a plurality of execute units including execute units 28A and 28B, a load/store unit 30, a reorder buffer 32, a register file 34, and a plurality of DSP units including DSP units 36A and 36B. The plurality of execute units will be collectively referred to herein as execute units 28, and may include more execute units than execute units 28A and 28B shown in FIG. 1. Additionally, an embodiment of microprocessor 12 may include one execute unit 28. Similarly, the plurality of DSP units will be collectively referred to as DSP units 36, and may include more or fewer DSP units than that shown in FIG. 1. Bus interface unit 20 is coupled to instruction cache 22 and data cache 24. Still further, a system bus 40 is coupled to bus interface unit 20. Instruction cache 22 is coupled to instruction decode unit 26, which is further coupled to execute units 28, DSP units 36, reorder buffer 32, and load/store unit 30. Reorder buffer 32, execute units 28, DSP units 36, and load/store unit 30 are each coupled to a result bus 38 for forwarding of execution results. Load/store unit 30 is coupled to data cache 24.

Generally speaking, microprocessor 12 is configured to execute instructions from a pair of instruction sets. Execute units 28 execute instructions from a first of the pair of instruction sets. DSP units 36 execute instructions from another of the pair of instruction sets. In one embodiment, execute units 28 execute the x86 instruction set while DSP units 36 execute instructions from the ADSP 2171 instruction set. Advantageously, each routine or instruction sequence may be coded with instructions belonging to the instruction set which most efficiently performs the function represented by that routine. Programs which may be most efficiently coded by using a pair of instruction sets may enjoy enhanced performance utilizing microprocessor 12.

When a program to be executed upon microprocessor 12 is coded, transitions from instructions coded in one instruction set to instructions coded in the other instruction set are separated by a memory operation. The memory operation uses a particular data address which is defined to indicate that instructions subsequent to the memory operation are coded in a different instruction set than the instructions prior to the memory operation. The particular data address will be referred to herein as the "predefined data address", for brevity. Instruction decode unit 26 dispatches memory operations to load/store unit 30 for execution. When load/store unit 30 detects the predefined data address, load/store unit 30 communicates the change in instruction sets to instruction decode unit 26. Instruction decode unit 26 is configured to dispatch instructions either to execute units 28 or DSP units 36 according to the instruction set indicated by load/store unit 30.

When microprocessor 12 initiates execution of a program, instructions are fetched, decoded, and dispatched as if the instructions belong to the instruction set executed by execute units 28. Upon detection of a memory operation having the predefined data address, instruction decode unit 26 begins fetching, decoding, and dispatching instructions according to the instruction set executed by DSP units 36. Instructions continue to be dispatched to DSP units 36 until a transition to the instruction set executed by execute units 28 is detected by load/store unit 30.

As used herein, the term "memory operation" refers to a transfer of data between microprocessor 12 and a main memory coupled to system bus 40. The transfer may actually occur within microprocessor 12 if the associated data is stored in data cache 24. A memory operation may correspond to a particular instruction, or may be implied within an instruction which uses a memory operand. Load memory operations are transfers of data from main memory to microprocessor 12. Conversely, store memory operations are transfers of data from microprocessor 12 to main memory. Often, the data transferred during a load memory operation is stored in a register within register file 34. Similarly, the data transferred during a store memory operation often originates in a register within register file 34. Additionally, the data for a store memory operation may be the result of executing an instruction. A memory operation includes a data address identifying the particular data bytes within main memory which are affected by the memory operation.

Instruction cache 22 is a high speed cache memory for storing instructions. It is noted that instruction cache 22 may be configured into a set-associative or direct mapped configuration. Instruction cache 22 may additionally include a branch prediction mechanism for predicting branch instructions as either taken or not taken. Instructions are fetched from instruction cache 22 and conveyed to instruction decode unit 26 for decode and dispatch to an execution unit.

In the embodiment shown, instruction decode unit 26 decodes each instruction fetched from instruction cache 22. Instruction decode unit 26 dispatches the instruction to execute units 28, load/store unit 30, or DSP units 36. Instruction decode unit 26 also detects the register operands used by the instructions and requests these operands from reorder buffer 32 and register file 34. In one embodiment, execute units 28 are symmetrical execution units. Symmetrical execution units are each configured to execute a particular subset of the instruction set employed by microprocessor 12. The subsets of the instruction set executed by each of the symmetrical execution units are the same. In another embodiment, execute units 28 are asymmetrical execution units configured to execute dissimilar instruction subsets. For example, execute units 28 may include a branch execute unit for executing branch instructions, one or more arithmetic/logic units for executing arithmetic and logical instructions, and one or more floating point units for executing floating point instructions. Instruction decode unit 26 dispatches an instruction to an execute unit 28 or load/store unit 30 which is configured to execute that instruction. Similar to execute units 28, DSP units 36 may be symmetrical or asymmetrical execution units. As used herein, the term "dispatch" refers to conveying an instruction to an appropriate execution unit or load/store unit for execution of the instruction.

It is noted that instruction decode unit 26 is configured to decode instructions from several instruction sets. Instructions from the instruction set executed by execute units 28 are decoded by instruction decode unit 26, as well as instructions from the instruction set executed by DSP units 36. Instruction decode unit 26 decodes fetched instructions according to one of the instruction sets. The instruction set used is indicated by load/store unit 30.

In one embodiment, DSP units 36 each include a digital signal processing core similar to the ADSP-2171 from Analog Devices, Inc. It is noted that memory operations performed during instruction sequences coded in the instruction set executed by DSP units 36 are performed by load/store unit 30.

Load/store unit 30 provides an interface between execute units 28, DSP units 36, and data cache 24. Load and store memory operations are performed by load/store unit 30 to data cache 24. Additionally, memory dependencies between load and store memory operations are detected and handled by load/store unit 30.

Execute units 28, DSP units 36, and load/store unit 30 may include one or more reservation stations for storing instructions whose operands have not yet been provided. An instruction is selected from those stored in the reservation stations for execution if: (1) the operands of the instruction have been provided, and (2) the instructions which are prior to the instruction being selected have not yet received operands. It is noted that a centralized reservation station may be included instead of separate reservations stations. The centralized reservation station is coupled between instruction decode unit 26, execute units 28, DSP units 36, and load/store unit 30. Such an embodiment may perform the dispatch function within the centralized reservation station.

Microprocessor 12 supports out of order execution, and employs reorder buffer 32 for storing execution results of speculatively executed instructions and storing these results into register file 34 in program order, for performing dependency checking and register renaming, and for providing for mispredicted branch and exception recovery. When an instruction is decoded by instruction decode unit 26, requests for register operands are conveyed to reorder buffer 32 and register file 34. In response to the register operand requests, one of three values is transferred to the execute unit 28 and/or load/store unit 30 which receives the instruction: (1) the value stored in reorder buffer 32, if the value has been speculatively generated; (2) a tag identifying a location within reorder buffer 32 which will store the result, if the value has not been speculatively generated; or (3) the value stored in the register within register file 34, if no instructions within reorder buffer 32 modify the register. Additionally, a storage location within reorder buffer 32 is allocated for storing the results of the instruction being decoded by instruction decode unit 26. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 28, DSP unit 36, or load/store unit 30 execute an instruction, the tag assigned to the instruction by reorder buffer 32 is conveyed upon result bus 38 along with the result of the instruction. Reorder buffer 32 stores the result in the indicated storage location. Additionally, execute units 28 and load/store unit 30 compare the tags conveyed upon result bus 38 with tags of operands for instructions stored therein. If a match occurs, the unit captures the result from result bus 38 and stores it with the corresponding instruction. In this manner, an instruction may receive the operands it is intended to operate upon. Capturing results from result bus 38 for use by instructions is referred to as "result forwarding".

Instruction results are stored into register file 34 by reorder buffer 32 in program order. Storing the results of an instruction and deleting the instruction from reorder buffer 32 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 32 discards the instructions subsequent to the mispredicted branch instructions. Instructions thus discarded are also flushed from execute units 28, load/store unit 30, DSP units 36, and instruction decode unit 26.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146,382, filed Oct. 29, 1993 by Witt, et al. These documents are incorporated herein by reference in their entirety.

Register file 34 includes storage locations for each register defined by the microprocessor architecture employed by microprocessor 12. For example, microprocessor 12 may employ the x86 microprocessor architecture. For such an embodiment, register file 34 includes locations for storing the EAX, EBX, ECX, EDX, ESI, EDI, ESP, and EBP register values.

Data cache 24 is a high speed cache memory configured to store data to be operated upon by microprocessor 12. It is noted that data cache 24 may be configured into a set-associative or direct-mapped configuration.

Bus interface unit 20 is configured to effect communication between microprocessor 12 and devices coupled to system bus 40. For example, instruction fetches which miss instruction cache 22 may be transferred from main memory by bus interface unit 20. Similarly, data requests performed by load/store unit 30 which miss data cache 24 may be transferred from main memory by bus interface unit 20. Additionally, data cache 24 may discard a cache line of data which has been modified by microprocessor 12. Bus interface unit 20 transfers the modified line to main memory.

It is noted that instruction decode unit 26 may be configured to dispatch an instruction to more than one execution unit. For example, in embodiments of microprocessor 12 which employ the x86 microprocessor architecture, certain instructions may operate upon memory operands. Executing such an instruction involves transferring the memory operand from data cache 24, executing the instruction, and transferring the result to memory (if the destination operand is a memory location). Load/store unit 30 performs the memory transfers, and an execute unit 28 performs the execution of the instruction.

Figure 2:
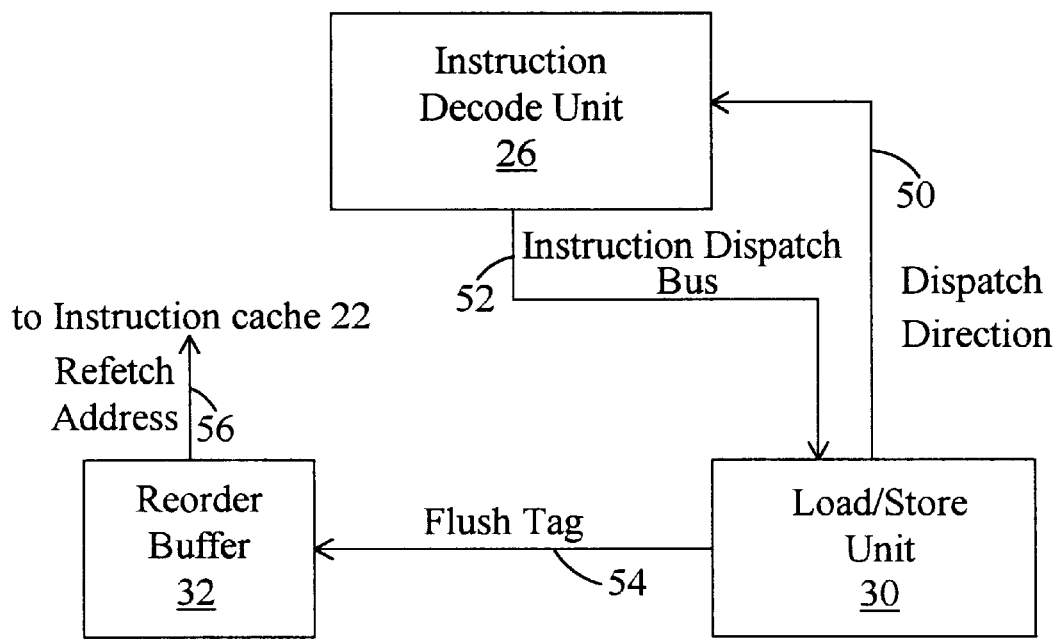
FIG. 2 is a block diagram of one embodiment of the instruction decode unit, load/store unit, and reorder buffer shown in FIG. 1, highlighting certain interconnections between the units.

Turning now to FIG. 2, instruction decode unit 26, load/store unit 30, and reorder buffer 32 are shown. Certain connections between the depicted units are shown in accordance with one embodiment of microprocessor 12. A dispatch direction conductor 50 and instruction dispatch bus 52 are coupled between load/store unit 30 and instruction decode unit 26. Additionally, a flush tag bus 54 is coupled between load/store unit 30 and reorder buffer 32. A refetch address bus 56 is coupled between reorder buffer 32 and instruction cache 22 (shown in FIG. 1).

Load/store unit 30 transmits an indication of the instruction set currently selected by the program executing within microprocessor 12 upon dispatch direction conductor 50. Instruction decode unit 26 may thereby determine not only which instruction set definition to use for decoding instructions, but also the execution units (e.g. execute units 28 or DSP units 36) to which instructions should be dispatched. In one embodiment, dispatch direction conductor 50 conveys a signal indicative, when asserted, that instructions should be dispatched to execute units 28. When deasserted, the signal is indicative that instructions should be dispatched to DSP units 36. For this embodiment, load/store unit 30 logically inverts the value conveyed upon dispatch direction conductor 50 when a memory operation having the predefined data address is detected. It is noted that, regardless of the units to which instructions are being dispatched, memory operations are dispatched to load/store unit 30. Instruction dispatch bus 52 conveys memory operations from instruction decode unit 26 to load/store unit 30.

When load/store unit 30 detects a memory operation having the predefined address, instruction decode unit 26 may have already dispatched instructions subsequent to the memory operation. Because the dispatched instructions are from a different instruction set than that indicated upon dispatch direction conductor 50 at the time the instructions are dispatched, the instructions are discarded by microprocessor 12. Discard is accomplished similar to the handling of a mispredicted branch instruction. The reorder buffer tag assigned to the memory operation having the predefined address is conveyed by load/store unit 30 upon flush tag bus 54. Reorder buffer 32 discards instructions subsequent to the memory operation. It is noted that when reorder buffer 32 discards instructions, the instructions are purged from other portions of microprocessor 12 as well. For example, discarded instructions may be stored within the aforementioned reservation stations. Reorder buffer 32 causes discarded instructions to be purged throughout microprocessor 12. Various mechanisms for carrying out instruction discard are well known.

In addition to discarding the subsequent instructions, reorder buffer 32 transmits the address of the instruction subsequent to the memory operation upon refetch address bus 56. Refetch address bus 56 may be used to cause instruction cache 22 to fetch instructions at the refetch address, as opposed to continuing instruction fetch according to its internal branch prediction mechanism. Therefore, branch mispredictions may convey the corrected target address upon refetch address bus 56 in addition to the refetch of instructions caused by a transition between instruction sets.

Figure 3:
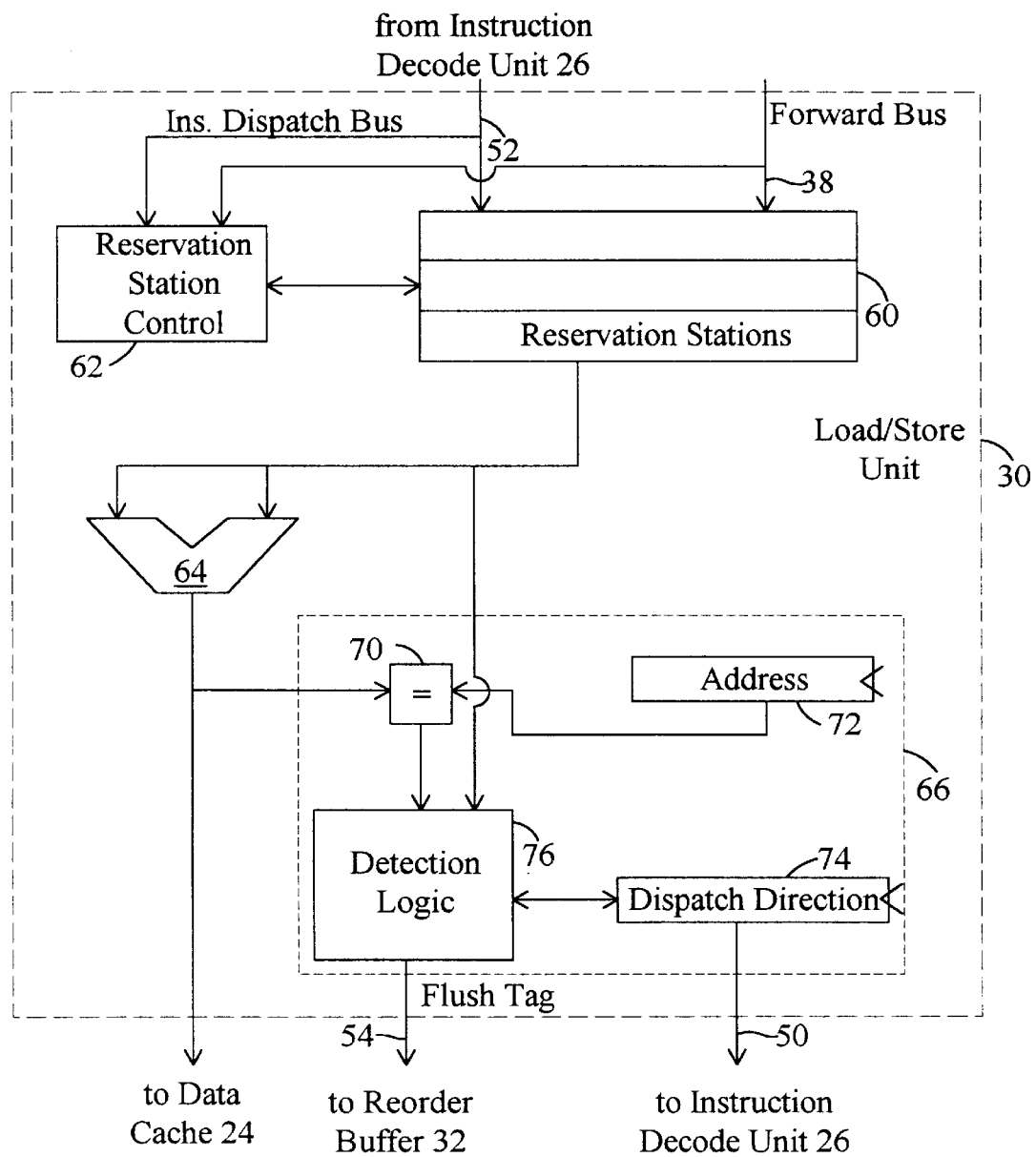
FIG. 3 is a block diagram of one embodiment of the load/store unit shown in FIG. 1.

Turning now to FIG. 3, a diagram of one embodiment of load/store unit 30 is shown. Load/store unit 30 includes a reservation station 60, a reservation station control unit 62, an address generator 64, and an address detection circuit 66. Reservation station 60 and reservation station control unit 62 are coupled to instruction dispatch bus 52 and forward bus 38. Reservation station 60 is further coupled to address generator 64 and address detection circuit 66. Furthermore, address generator 64 is coupled to address detection circuit 66. Still further, address detection circuit 66 is coupled to flush tag bus 54 and dispatch direction conductor 50.

Memory operations are received by load/store unit 30 into reservation station 60 under the control of reservation station control unit 62. Operands may be received concurrently, or may be provided at a later time via forward bus 38. When the operands have been provided for a memory operation, reservation station control unit 62 selects the memory operation for execution by load/store unit 30. The selected memory operation is conveyed to address generator 64. Additionally, the reorder buffer tag assigned to the memory operation is conveyed to address detection circuit 66.

Address generator 64 generates the data address associated with the memory operation in accordance with the microprocessor architecture employed by microprocessor 12. For example, the x86 microprocessor architecture specifies that an offset is formed using the operands provided with the instruction. The offset is then added to a segment base stored in a segment register associated with the memory operation to form a linear address. The linear address is then translated to a physical address for main memory. Typically, address generator 64 performs the steps to form the linear address and the translation is performed in an address translation unit (not shown). Operands used to form the address may comprise an immediate value, a displacement, and one or more register values.

The address formed by address generator 64 is transferred to data cache 24 for use in accessing the corresponding data. In addition, the address is conveyed to address detection circuit 66. Address detection circuit 66 determines if the address is the predefined data address. If the address is determined to be the predefined address, address detection circuit 66 conveys an indication of the newly selected instruction set upon dispatch direction conductor 50. Additionally, the reorder buffer tag corresponding to the memory operation is conveyed upon flush tag bus 54.

In one embodiment, address detection circuit 66 comprises a comparator 70, an address register 72, a dispatch direction register 74, and a detection logic circuit 76. Comparator 70 is coupled to receive the address generated by address generator 64 and the address stored in address register 72. Comparator 70 is further coupled to detection logic circuit 76, and is configured to convey a signal or signals indicative of equality or inequality of the two compared addresses. Detection logic circuit 76 is additionally coupled to receive from reservation station 60 the reorder buffer tag corresponding to the memory operation being executed by load/store unit 30. Still further, detection logic circuit 76 is coupled to dispatch direction register 74, which is further coupled to dispatch direction conductor 50. The value stored in dispatch direction register 74 is conveyed upon dispatch direction conductor 50.

If comparator circuit 70 detects equality between the data address corresponding to the memory operation being executed by load/store unit 30 and the address stored in address register 72, then a boundary between instructions from one instruction set and instructions from another instruction set has been detected. Detection logic circuit 76 is configured to update dispatch direction register 74 with a value indicative of the newly selected instruction set, and to convey the reorder buffer tag received from reservation station 60 upon flush tag bus 54. In one embodiment, dispatch direction register 74 comprises a single bit indicative, when set, that instructions being dispatched and executed belong to the instruction set executed by execute units 28. When clear, the bit indicates that instructions being dispatched and executed belong to the instruction set executed by DSP units 36.

In one embodiment, address register 72 stores a single data address. The single data address may be used by memory operations forming the boundary between instructions from dissimilar instruction sets. In such an embodiment, the memory operation forming the boundary may simply be used to indicate the boundary (i.e. the data transferred from the memory location identified by the single data address may be ignored). Alternatively, the data transferred to and from the data address may be used to pass information between the routines comprising the dissimilar instruction sets.

In another embodiment, address register 72 may store a value indicative of a range of addresses defined to be the predefined data address. Comparator circuit 70 is configured to detect any data address within the specified range as "equal" to the address generated by address generator 64. For example, address register 72 may store a base address and a size. Data addresses in the range between the base address and the base address plus the size are defined to be the predefined data address. For this embodiment, detection logic circuit 76 may be configured to detect addresses within the range as an indication of a transition from instructions belonging to a first instruction set to instructions belonging to a second instruction set. Addresses outside of the range are indicative of a transition from instructions belonging to the second instruction set to instructions belonging to the first instruction set. Logic detection circuit 76 combines the value stored in dispatch direction register 74 and the equality/inequality indication from comparator 70 to detect the boundaries between instructions from dissimilar instruction sets. For example, an indication that instructions being dispatched belong to the first instruction set and an indication of equality are indicative of a boundary. Additionally, an indication that instructions being dispatched belong to the second instruction set and an indication of inequality are indicative of another boundary. It is noted that the range of addresses detected by comparator 70 in this embodiment may comprise an address space for use by instructions belonging to the second instruction set. The memory operation used to identify the transition between instruction sets may thereby perform a useful function in addition to identifying the transition (i.e. loading or storing a value used by the subsequent instructions).

In still another embodiment employing a range of addresses defined by address register 72, address detection circuit 66 detects instruction addresses as an indication of a transition between instruction sets. Such an embodiment of address detection circuit 66 may be included in instruction cache 22 or instruction decode unit 26. In this embodiment, instruction set transitions may be detected prior to instruction dispatch. Reorder buffer flush may thereby be advantageously avoided.

It is noted that address register 72 may be programmed to define the address indicative of a transition between instruction sets. The address may be programmed via a special instruction at the time microprocessor 12 is powered on, for example. A computer system employing microprocessor 12 thereby enjoys flexibility in determining the predefined address. In another embodiment, the predefined address is not programmable. For such an embodiment, a decoder circuit receives the address formed by address generator 64 and decodes the address to detect the predefined data address instead of including address register 72 and comparator 70.

Figure 4:
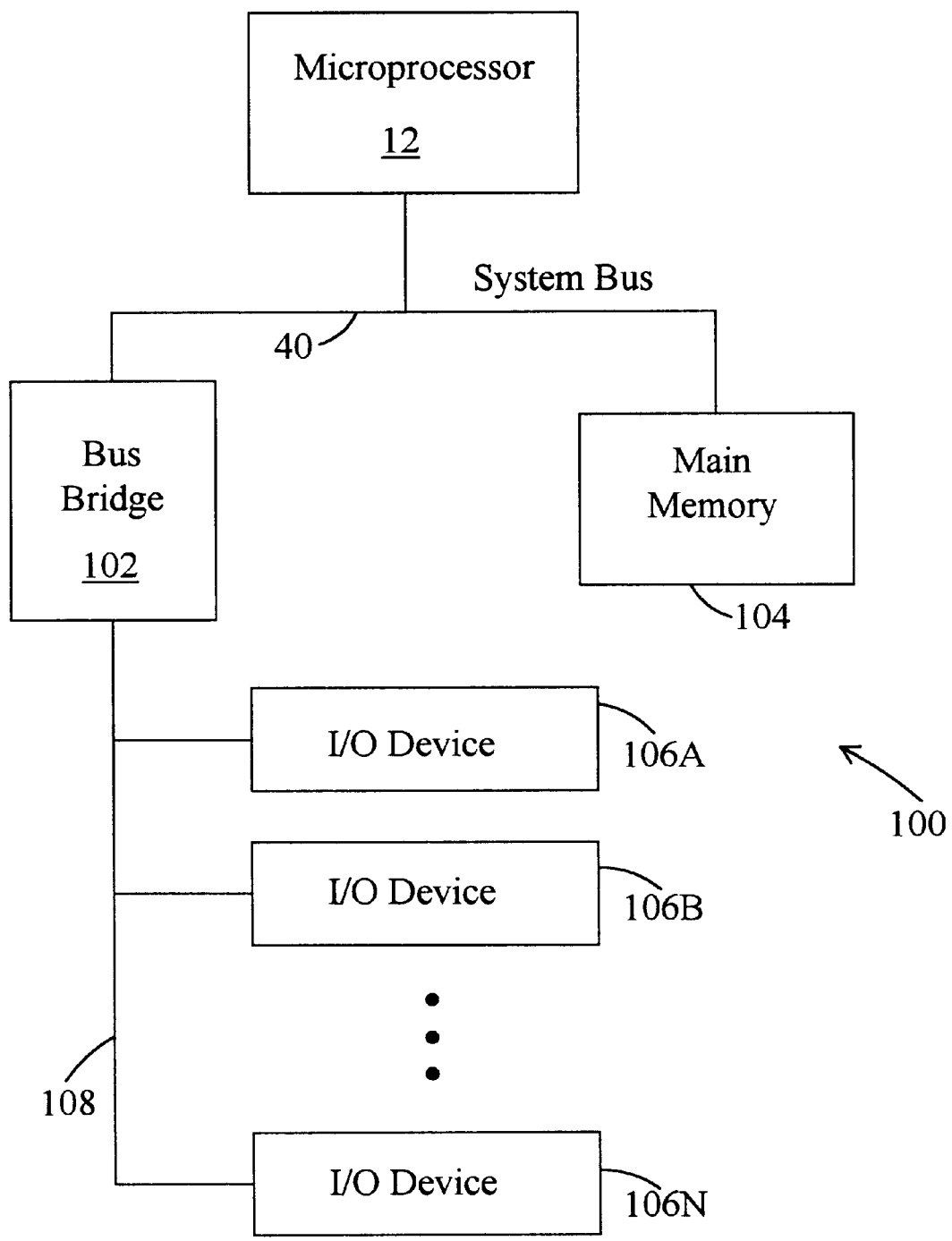
FIG. 4 is a block diagram of a computer system including the microprocessor shown in FIG. 1.

Turning now to FIG. 4, a computer system 100 including microprocessor 12 is shown. Computer system 100 further includes a bus bridge 102, a main memory 104, and a plurality of input/output (I/O) devices 106A–106N. Plurality of I/O devices 106A–106N will be collectively referred to as I/O devices 106. Microprocessor 12, bus bridge 102, and main memory 104 are coupled to system bus 40. I/O devices 106 are coupled to an I/O bus 108 for communications with bus bridge 102.

Bus bridge 102 is provided to assist in communications between I/O devices 106 and devices coupled to system bus 40. I/O devices 106 typically require longer bus clock cycles than microprocessor 12 and other devices coupled to system bus 40. Therefore, bus bridge 102 provides a buffer between system bus 40 and input/output bus 108. Additionally, bus bridge 102 translates transactions from one bus protocol to another. In one embodiment, input/output bus 108 is an Enhanced Industry Standard Architecture (EISA) bus and bus bridge 102 translates from the system bus protocol to the EISA bus protocol. In another embodiment, input/output bus 108 is a Peripheral Component Interconnect (PCI) bus and bus bridge 102 translates from the system bus protocol to the PCI bus protocol. It is noted that many variations of system bus protocols exist. Microprocessor 12 may employ any suitable system bus protocol.

I/O devices 106 provide an interface between computer system 100 and other devices external to the computer system. Exemplary I/O devices include a modem, a serial or parallel port, a sound card, etc. I/O devices 106 may also be referred to as peripheral devices. Main memory 104 stores data and instructions for use by microprocessor 12. In one embodiment, main memory 104 includes at least one Dynamic Random Access Memory (DRAM) cell and a DRAM memory controller.

It is noted that although computer system 100 as shown in FIG. 4 includes one microprocessor, other embodiments of computer system 100 may include multiple microprocessors similar to microprocessor 12. Similarly, computer system 100 may include multiple bus bridges 102 for translating to multiple dissimilar or similar I/O bus protocols. Still further, a cache memory for enhancing the performance of computer system 100 by storing instructions and data referenced by microprocessor 12 in a faster memory storage may be included. The cache memory may be inserted between microprocessor 12 and system bus 40, or may reside on system bus 40 in a "lookaside" configuration.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

Figure 5:
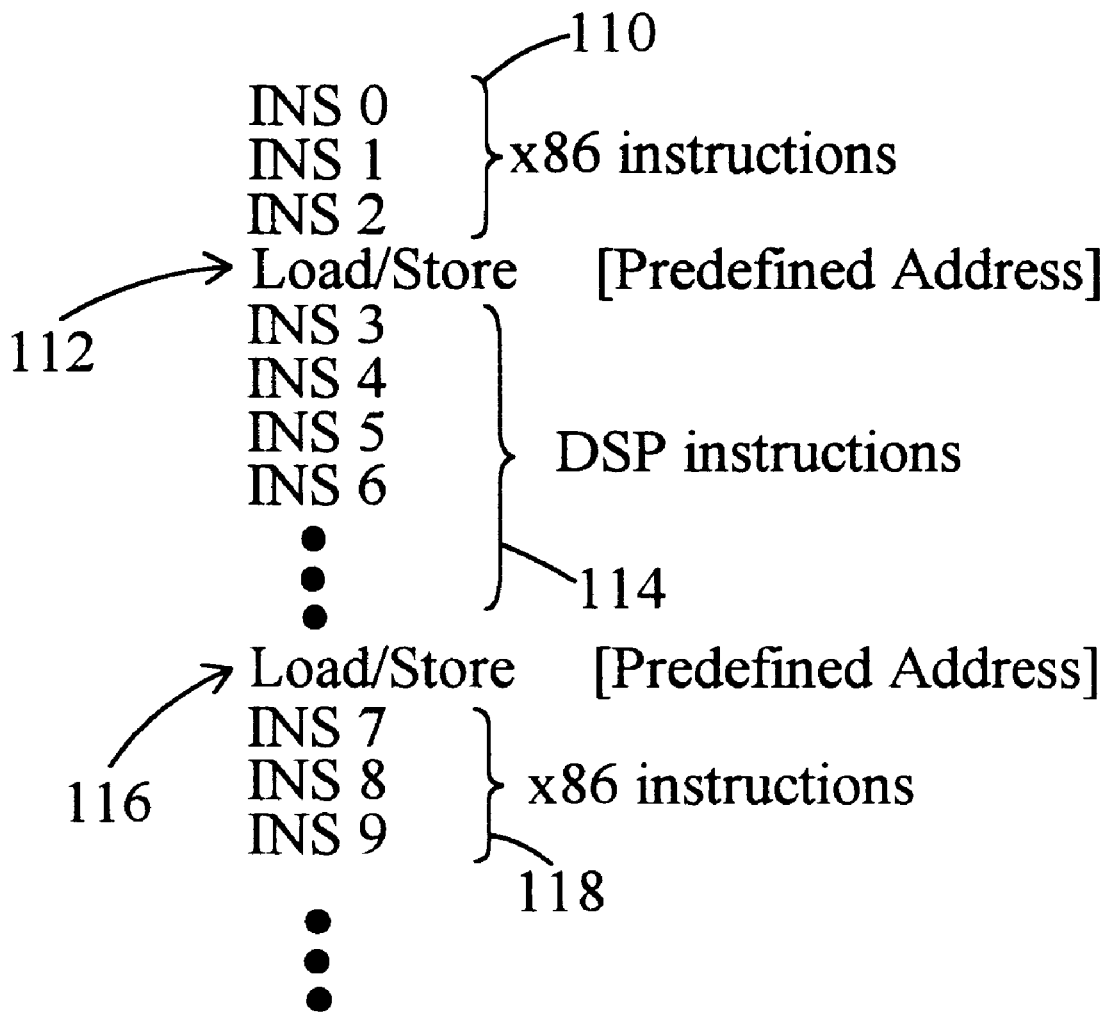
FIG. 5 is an exemplary instruction sequence illustrating the use memory operations as boundaries between instructions belonging to different instruction sets.

Turning now to FIG. 5, a portion of an exemplary program is shown to further illustrate the use of memory operations as boundary instructions. The label INS followed by a numeral in FIG. 5 is indicative of an arbitrary instruction within the indicated instruction set. A first instruction sequence 110 including instructions INS0, INS1, and INS2 are included in the program. The instructions within instruction sequence 110 are coded in the x86 instruction set. A second instruction sequence 114 including instructions INS3, INS4, INS5, and INS6 is also included within the program. The instructions within instruction sequence 114 are coded in the ADSP 2171 instruction set. Since instruction sequence 110 and instruction sequence 114 comprise instructions from different instruction sets, an indication of the transition from instruction sequence 110 to instruction sequence 114 is needed. Memory operation 112 provides this indication. Similarly, the instructions within an instruction sequence 118 (including instructions INS7, INS8, and INS9) comprise instructions from the x86 instruction set. Therefore, an indication of the transition from instruction set 114 to instruction set 118 is needed. Memory operation 116 provides this indication.

As shown in FIG. 5, memory operations 112 and 116 may be a load memory operation or a store memory operation. The address associated with each memory operation is the predefined data address indicating the transition. Memory operations 112 and 116 are therefore seen to indicate the boundary between instruction sequences 110 and 114 and instruction sequences 114 and 118, respectively. It is noted that instruction sequences 110, 114, and 118 may not be stored in consecutive memory locations. For example, instruction INS2 may be a branch instruction and the target of the branch instructions may be memory operation 112.

It is further noted that the above discussion often refers to instructions being subsequent to or prior to other instructions. As used herein, a first instruction is prior to a second instruction if the first instruction is encountered first in the order of instructions within the program (i.e. in program order). Similarly, a first instruction is subsequent to a second instruction if the second instruction is subsequent to the second instruction in program order.

In accordance with the above disclosure, a microprocessor has been described which is configured to execute instructions from a pair of instruction sets. A memory operation having a predefined data address is used to indicate the boundary between an instruction sequence comprising instructions from a first instruction set and another instruction sequence comprising instructions from a second instruction set. Advantageously, a program may utilize the instruction set which is most efficient for performing each routine within the program. The program may enjoy enhanced performance with respect to a similar program coded entirely in a single instruction set.

Numerous variations and modifications will become apparent to those skilled in the art once the above disclosure is fully appreciated. It is intended that the following claims be interpreted to embrace all such variations and modifications.

What is claimed is:

1. A microprocessor comprising:

an instruction cache configured to store a plurality of instructions including a first plurality of instructions belonging to a first instruction set and a second plurality of instructions belonging to a second instruction set;

an instruction decode unit coupled to said instruction cache and configured to receive said plurality of instructions from said instruction cache, wherein said instruction decode unit is configured to decode said plurality of instructions; and a first register for storing a predefined data address, wherein said predefined data address is defined to indicate that a corresponding memory operation forms a boundary between said first plurality of instructions and said second plurality of instructions; and a load/store unit coupled to said instruction decode unit, wherein said load/store unit is configured to receive memory operations included within said plurality of instruction from said instruction decode unit, said load/store unit having an address generator configured to generate a data address for a memory operation, said load/store unit Also having an address detection circuit coupled to said address generator and configured to compare said predefined data address in said first register to said data address generated by said data address generator in order to detect said boundary, said load/store unit further having a second register configured to store an indication of which instruction set is being dispatched by said instruction decode unit, said load/store unit being configured to convey a first indication of said first instruction set to said instruction decode unit if said boundary is not detected and to convey a second indication to said instruction decode unit if said boundary is detected, and wherein said instruction decode unit is configured to decode instruction from said first instruction set upon receiving said first indication and to decode instructions from said second instruction set upon receiving said second indication.

2. The microprocessor as recited in claim 1 further comprising a first execution unit configured to execute instructions from said first instruction set, wherein said instruction decode unit is configured to dispatch said first plurality of instructions to said first execution unit upon receipt of said first indication from said load/store unit.

3. The microprocessor as recited in claim 1 further comprising a second execution unit configured to execute instructions from said second instruction set, wherein said instruction decode unit is configured to dispatch instructions to said second execution unit upon receipt of said second indication from said load/store unit.

4. The microprocessor as recited in claim 1 wherein said predefined data address is one of a range of data addresses defined to indicate said boundary.

5. The microprocessor as recited in claim 4 wherein detection of an address within said range of data addresses is indicative of a first boundary, and wherein instructions prior to said first boundary belong to said first instruction set, and wherein instructions subsequent to said first boundary belong to said second instruction set.

6. The microprocessor as recited in claim 4 wherein detection of an address outside of said range of data addresses is indicative a second boundary, and wherein instructions prior to said second boundary belong to said second instruction set, and wherein instructions subsequent to said second boundary belong to said first instruction set.

7. The microprocessor as recited in claim 1 further comprising a reorder buffer coupled to said load/store unit, wherein said reorder buffer is configured to store instruction execution results, and wherein said load/store unit is configured to convey a tag indicative of said corresponding one of said memory operations to said reorder buffer.

8. The microprocessor as recited in claim 7 wherein said microprocessor is configured to discard instructions subsequent to said corresponding one of said memory operations under the direction of said reorder buffer.

9. The microprocessor as recited in claim 8 wherein said reorder buffer is configured to convey a refetch address to said instruction cache, and wherein said refetch address locates a particular instruction consecutive to said corresponding one of said memory operations.

10. The microprocessor as recited in claim 9 wherein said instruction cache is configured to fetch instructions stored at said refetch address.

11. The microprocessor as recited in claim 10 wherein said instruction decode unit is configured to dispatch said instructions stored at said refetch address to an execution unit configured to execute instructions from said second instruction set, if said instructions prior to said corresponding one of said memory operations belong to said first instruction set.

12. The microprocessor as recited in claim 10 wherein said instruction decode unit is configured to dispatch said instructions stored at said refetch address to an execution unit configured to execute instructions from said first instruction set, if said instructions prior to said corresponding one of said memory operations belong to said second instruction set.

13. The microprocessor as recited in claim 1 wherein said address detection circuit comprises;

a comparator coupled to receive said data address generated by said address generator and said predefined data address, wherein said comparator is configured to produce a signal indicative of equality between said data address and said predefined data address;

a logic circuit coupled to said comparator and said second register, wherein said logic circuit indicates detection of said boundary if said comparator indicates equality and said second register indicates said first instruction set.

14. The microprocessor as recited in claim 13 wherein said logic circuit is further configured to indicate detection of said boundary if said comparator indicates inequality and said second register indicates said second instruction set.

15. A method for executing instructions from a pair of instruction sets in a microprocessor, comprising:

providing a first plurality of instructions belonging to a first of said pair of instruction sets and a second plurality of instructions belonging to a second of said pair of instruction sets storing a predefined data address defined to indicate that a corresponding memory operation forms a boundary between said first plurality of instructions and said second plurality of instructions generating a data address for a memory operation corresponding to one of said instructions comparing said data address to said predefined address detecting said memory operation forming said boundary if said data address matches said predefined address;

executing instructions from said first of said pair of instruction sets if said memory operation is not detected; and executing instruction from said second of said pair of instruction sets if said memory operation is detected.

16. The method as recited in claim 15 wherein said predefined data address comprises one of a row of data addresses.

17. The method as recited in claim 15 further comprising detecting second memory operation having a second predefined data address defined to indicate a second boundary between a third plurality of instructions belonging to said second of said pair of instruction sets and a fourth plurality of instructions belonging to said first of said pair of instruction sets.

18. The method as recited in claim 17 wherein said detecting a second memory operation is performed subsequent to said detecting a first memory operation.

19. The method as recited in claim 18 further comprising returning execution to said first instruction set if said second memory operation is detected.

* * * * *